March 9, 1943.   R. POLK, SR., ET AL   2,313,714
HOLDING FORK FOR CITRUS FRUITS
Original Filed June 7, 1939
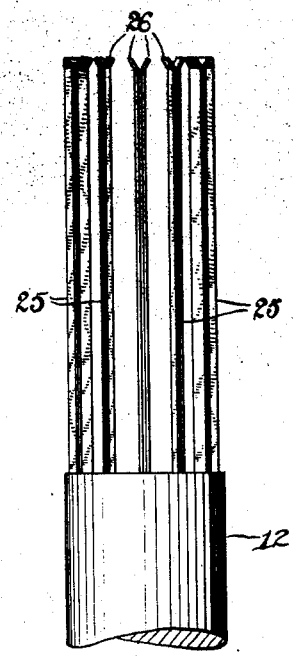
Fig. 1.
Fig. 2.
INVENTOR.
RALPH POLK SR. AND
BY: RALPH POLK JR.,
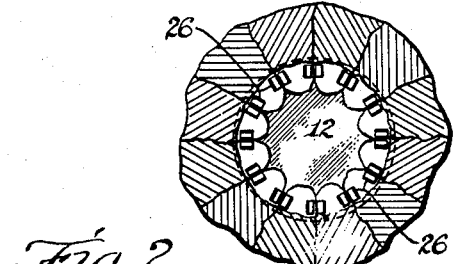
ATTORNEYS.

Patented Mar. 9, 1943

2,313,714

UNITED STATES PATENT OFFICE 2,313,714

HOLDING FORK FOR CITRUS FRUITS

Ralph Polk, Sr., Miami, and Ralph Polk, Jr., Tampa, Fla., assignors to The Polk Development Company, Tampa, Fla., a copartnership composed of Ralph Polk, Sr., and Ralph Polk, Jr.

Original application June 7, 1939, Serial No. 277,848. Divided and this application March 20, 1942, Serial No. 435,518

2 Claims. (Cl. 146—3)

This application is a division from our application Serial No. 277,848 filed June 7, 1939, for Holding fork for citrus fruits.

In preparing citrus fruits, such as grapefruit, for canning, it is necessary to separate the segment-shaped juice-cells from the inedible radiating integuments. To perform this operation mechanically, mechanisms such as are shown in Patents 2,121,098 and 2,129,101 have been put into commercial operation.

In order to support the peeled fruit for manipulation, it has heretofore been customary to provide a holding fork comprising a main stem or head and a circular series of small diameter tines, circumferentially spaced and so sized and proportioned that the tines could be caused to penetrate the peeled fruit parallel with the axis of the core of the fruit with the several tines lying within the apices of the fruit segments radially just outside the roots of the V's formed by the radiating integuments. The group of tines serves to hold the integuments as a bonded group during further manipulation.

In grapefruit, the apices of the V-shaped integuments are radially spaced from the polar axis of the fruit. In the seeded varieties the space within the apices of the integuments is filled with a pithy core which provides some radial bonding for the integuments, and holding forks, such as have been described above, serve adequately to hold the integuments during the operation of removal of the juice-cell groups.

In the seedless varieties the bond between adherent radial integuments is generally weaker than in the seeded varieties and, generally, there is no pithy core. Consequently, holding forks of the above-described character are not satisfactory unless they are so accurately proportioned and injected that the tines fit closely in the apices of a majority of the fruit segments.

Such accurate proportioning and injection is not commercially practicable and the object of our present invention is to provide an improved holding implement which will afford a better anchorage for the fruit, especially fruits of the seedless type.

The accompanying drawing illustrates our invention.

Fig. 1 is an elevation of our improved tool; and

Fig. 2 a plan showing said tool projected into a peeled citrus fruit shown in fragmentary cross section.

Our improved tool comprises a plurality of thin, narrow, blunt edged blades 25 having lengths equal to the major portion of a diameter of a citrus fruit and arranged in parallel pairs and circumferentially spaced in a circular series having a radius slightly greater than the radial spacing of the integument apices in the fruit. The tips 26 of each pair of blades 25 are oppositely flared slightly and the adjacent faces of each pair of blades are parallel, or approximately parallel, to a radius of the circular series.

These blades are anchored in a suitable body 12.

The blades 25 are so radially spaced from the axis of the series and the blades of each pair are so laterally spaced from each other that, when projected polarwise into a peeled fruit, the flaring tips 26 of the pairs of blades will straddle adherent pairs of radial integuments of the fruit radially beyond the apices of the integuments and thus serve as anchorages to hold the integuments against radial displacement.

We claim as our invention:

1. A holding fork for whole peeled citrus fruits comprising, a plurality of pairs of parallel, thin, narrow, blunt-edged blades arranged by circumferentially-spaced radial pairs in a circular series, the radial positions of said blades slightly exceeding the radial positions of the vertices of the segments of the fruit to be treated, and the blades of each pair being closely adjacent and the pairs circumferentially spaced to approximate segment arrangement of the fruit to be treated, the arrangement of the blades being such that the major number of pairs of blades, when projected polarwise into a fruit, may respectively straddle two adherent radial integuments of adjacent fruit segments close to the apices thereof.

2. A holding fork for whole peeled citrus fruits comprising, a plurality of pairs of parallel, thin, narrow, blunt-edged blades arranged by circumferentially-spaced radial pairs in a circular series, the radial positions of said blades slightly exceeding the radial positions of the vertices of the segments of the fruit to be treated, and the blades of each pair being closely adjacent and the pairs circumferentially spaced to approximate segment arrangement of the fruit to be treated, the arrangement of the blades being such that the major number of pairs of blades, when projected polarwise into a fruit, may respectively straddle two adherent radial integuments of adjacent fruit segments close to the apices thereof, the tips of the blades of each pair being flared away from each other circumferentially of the series, and the radial extent of the blades exceeding the circumferential extent thereof by several times.

RALPH POLK, Sr.
RALPH POLK, Jr.